C. M. SPARKS.
Churn.
No. 219,658. Patented Sept. 16, 1879.
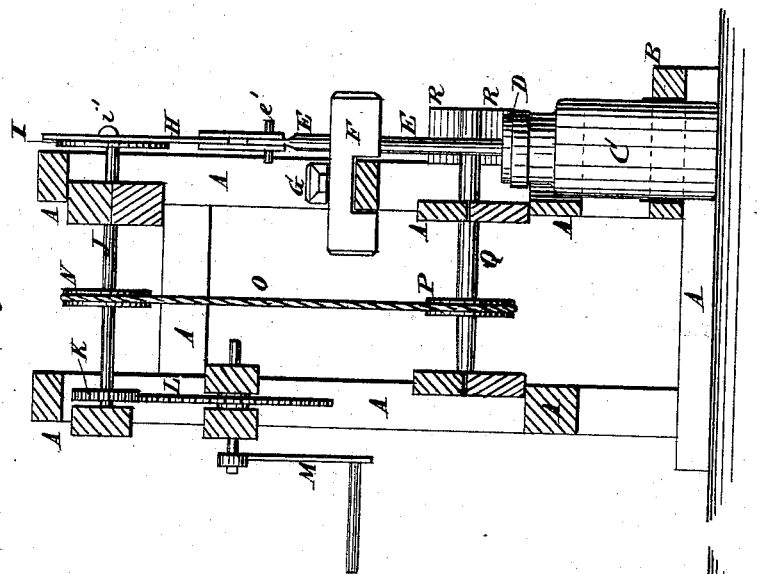
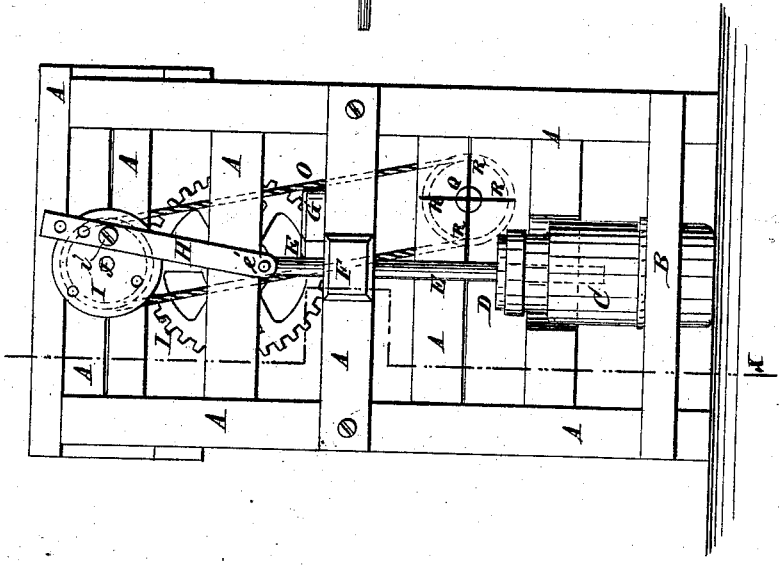
WITNESSES:
Achilles Sehehl.
C. Sedgwick
INVENTOR:
C. M. Sparks
BY Munn & Co
ATTORNEYS.

UNITED STATES PATENT OFFICE.

CHARLES M. SPARKS, OF EARLE'S, KENTUCKY.

IMPROVEMENT IN CHURNS.

Specification forming part of Letters Patent No. 219,658, dated September 16, 1879; application filed May 26, 1879.

*To all whom it may concern:*

Be it known that I, CHARLES MILTON SPARKS, of Earle's, in the county of Muhlenburg and State of Kentucky, have invented a new and useful Improvement in Churning-Machines, of which the following is a specification.

Figure 1 is a side view of my improved machine. Fig. 2 is a vertical section of the same, taken through the line $x$ $x$ Fig. 1.

Similar letters of reference indicate corresponding parts.

The object of this invention is to furnish an improved churning-machine, which shall be simple in construction, convenient in use, and effective in operation, bringing the butter in a very short time, and developing all the butter there may be in the milk.

The invention consists in the combination of the detachable guide-bar and the button with the dasher-handle of the churn and with the frame with which the driving mechanism is connected, as hereinafter fully described.

A represents the frame of the machine, which is formed of four posts connected by side and end bars.

To the lower part of one side of the frame A is attached a small platform, B, which has a hole formed through it to receive the churn C and keep it in place while being used.

The churn C may be made of any suitable material, and is provided with a cover, D, and an ordinary up-and-down dasher, the handle E of which passes up through the cover D and through a guide-hole in the projecting end of the bar F. The bar F is notched to a side bar of the frame A, and is secured in place detachably by a button, G, pivoted to said side bar.

The upper end of the dasher-handle E, at a point a little above the guide-bar F, is pivoted to the end of a connecting-bar, H. The upper part of the connecting-bar H is pivoted to the crank-wheel I by a crank-pin, $i'$. Several holes are formed in the upper part of the connecting-bar H and in the wheel I at different distances from its center, to receive the crank-pin $i'$, so that the dasher may be adjusted to have a longer or a shorter stroke, as the quantity of milk to be churned may require.

The crank-wheel I is attached to the end of the shaft J, which revolves in bearings attached to the side bars of the frame A, and to it, at or near its other end, is attached a small gear-wheel, K. The teeth of the gear-wheel K mesh into the teeth of a larger gear-wheel, L, which is pivoted to side bars of the frame A, and to the end of its outer journal is attached the crank M. With this construction, by a slow movement of the crank M a rapid movement will be given to the dasher, bringing the butter in a very short time.

To the driving-shaft J is attached a pulley, N, around which passes an endless band, O. The endless band O also passes around a pulley, P, attached to the shaft Q, which revolves in bearings attached to the side bars of the frame A.

To the projecting end of the shaft Q are attached wings or fans R, by the revolution of which a current of air is driven against the top of the churn to keep flies away from it while the churning is being done. With this construction, by turning the button G and withdrawing the coupling-pin $e'$ from the upper end of the dasher-handle E, the guide-bar F can be raised from the said dasher-handle, leaving the churn entirely free. The churn can be connected with the machine with equal facility by reversing this operation.

Having thus described my invention, I claim as new and desire to secure by Letters Patent—

The combination of the detachable guide-bar F and the button G with the dasher-handle E of the churn C, and with the frame A with which the driving mechanism H I J K L M is connected, substantially as herein shown and described.

CHARLES M. SPARKS.

Witnesses:
J. L. McCOWN,
NEW HARRIS.